United States Patent [19]

Saka

[11] Patent Number: 4,493,565
[45] Date of Patent: Jan. 15, 1985

[54] COMBINED THERMOMETER AND CALCULATOR

[75] Inventor: Masakazu Saka, Nara, Japan

[73] Assignee: Sharp Kabushiki Kaisha, Osaka, Japan

[21] Appl. No.: 400,265

[22] Filed: Jul. 21, 1982

[30] Foreign Application Priority Data

Jul. 28, 1981 [JP] Japan .............................. 56-118772

[51] Int. Cl.³ ............................................ G01K 7/00
[52] U.S. Cl. .................................... 374/185; 374/170; 377/25; 331/66
[58] Field of Search ............... 374/185, 183, 170, 171, 374/163; 331/66; 377/25; 364/557

[56] References Cited

U.S. PATENT DOCUMENTS

| 3,828,338 | 8/1974 | Rekai | 374/185 X |
| 4,125,871 | 11/1978 | Martin | 331/66 X |
| 4,150,573 | 4/1979 | Iinuma et al. | 374/185 |
| 4,206,646 | 6/1980 | Spellman et al. | 374/185 X |
| 4,359,285 | 11/1982 | Washburn | 331/66 X |

FOREIGN PATENT DOCUMENTS 161978 12/1979 Japan .................................. 374/170

OTHER PUBLICATIONS

Thermometer Update; "Type 2572 Digital Thermometer: A Wide Temperature Range is Featured", *JEE*, 10-1977, pp. 31-34, Yoshio Oguma.
*Programming Microprocessors*, M. W. McMullan, 3-1977, pp. 154-157.

*Primary Examiner*—Jerry W. Myracle
*Assistant Examiner*—Tom Noland
*Attorney, Agent, or Firm*—Birch, Stewart, Kolasch & Birch

[57] ABSTRACT

This invention relates to a thermometry device which measures temperature using an electronic calculator system. The device includes a resistor whose resistance value varies depending upon temperature, an oscillator providing a wave-form oscillating at a frequency which is dependent upon temperature, a clock generator providing reference clock pulses and a counter for counting the clock pulses within a length of time as defined by the frequency of the waveform divided by a factor. Temperature-related information is obtained from the results of the counting.

3 Claims, 12 Drawing Figures

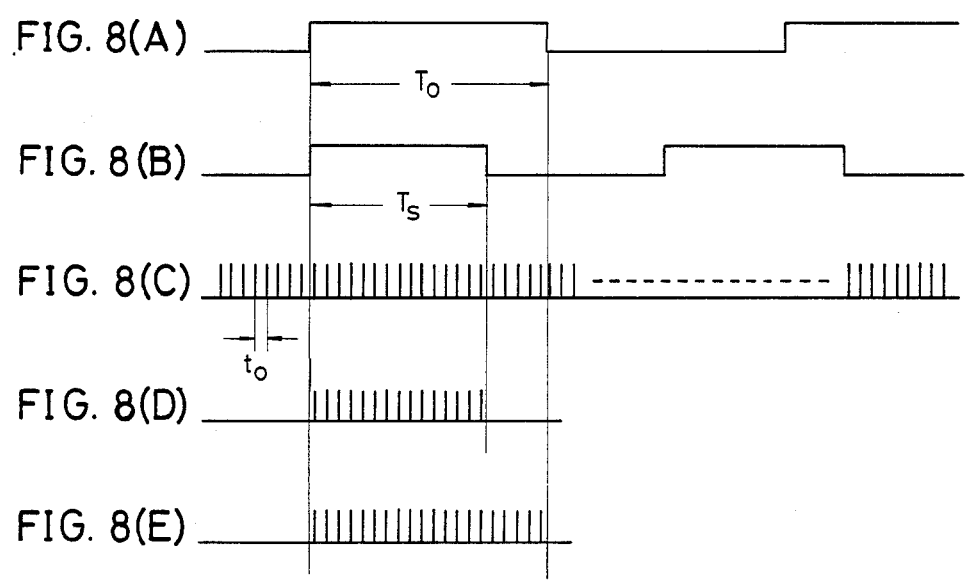

COMBINED THERMOMETER AND CALCULATOR

BACKGROUND OF THE INVENTION

This invention relates to a thermometry device and more particularly to a thermometry device which embodies an electronic calculator system. A digital electronic thermometer commonly includes a thermistor as a thermometry resistor whose resistance value varies depending upon temperature.

As suggested in Japanese Patent Kokai No. 53-69685, corresponding to U.S. Pat. No. 4,150,573, another well known device includes a reference resistor and a thermometry device.

In the device of this patent an oscillator is provided whose oscillation frequency vaires in proportion or in inverse proportion to the value of the selected resistor, thus making resistance variations in the thermometry resistor substantially linearly proportional to temperature. Output pulses from the oscillator are counted within a predetermined limited period of time to restrain thermometry within a range covering from 35° to 45° C.

The temperature dependency of the resistance of the thermistor in the conventional device is inaccurate and does not have a linear relationship in a wide temperature range, thus requiring complex arithmetic logic processes.

In the case where the output pulses of the oscillator are counted within the limited period of time, additional hardware such as a counter is required and it is very difficult to set up the thermometry device with cost savings.

OBJECTS AND SUMMARY OF THE INVENTION

With the foregoing in mind, it is an object of the present invention to provide a thermometry device which may measure temperature in a wide range, may be constructed inexpensively with few parts, making use of an electronic calculator system.

According to a broadest aspect of the present invention, a thermometry device comprises an oscillator oscillating at a frequency which is dependent upon temperature, means for generating reference clock pulses, means responsive to said clock pulses for counting within a length of time as defined by the waveform divided, and means for obtaining temperature-related information from the results of counting by said counting means.

BRIEF DESCRIPTION OF THE DRAWINGS

For a more complete understanding of the present invention and for further objects and advantages thereof, reference is now made to the following description taken in conjunction with the accompanying drawings, in which;

FIG. 8(A)–FIG. 8(E) are waveform charts for an explanation of operation of the circuit of FIG. 7.

DETAILED DESCRIPTION OF INVENTION

Figure 1:
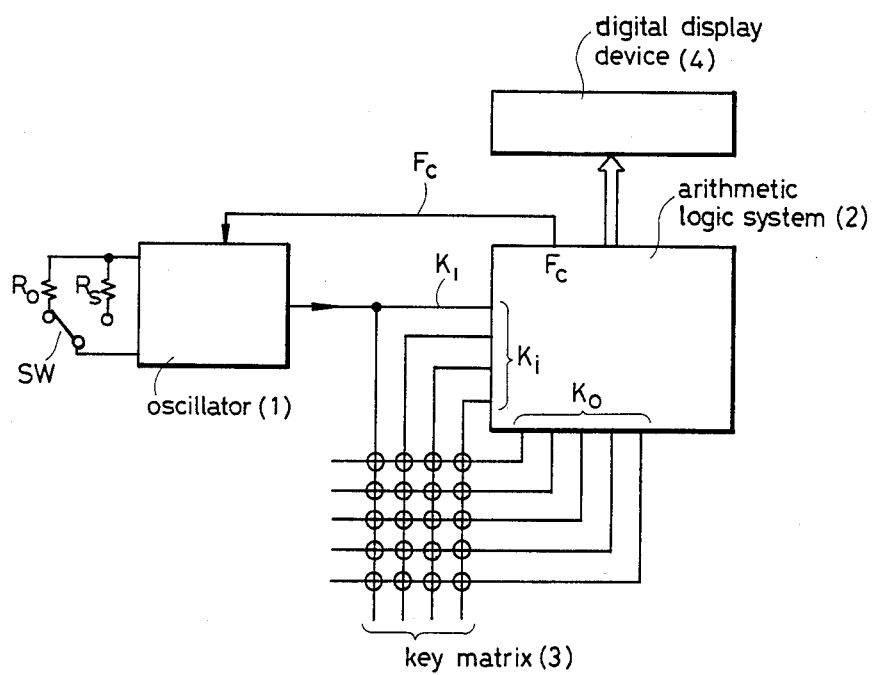
FIG. 1 is a circuit diagram of a thermometry device constructed according to an embodiment of the present vention.

Referring now to FIG. 1, there is illustrated a circuit diagram of an electronic calculator having thermometry means in accordance with an embodiment of the present invention.

This device comprises an oscillator (1) oscillating at different frequencies which are dependent upon either a value of a reference resistor $R_0$ or a value of a thermometry resistor (a thermistor and the like) $R_s$ according to the position of a changing-over switch SW switchable between the reference resistor $R_0$ and the thermometry resistor $R_s$. An arithmetic logic system 2 which can be used as an electronic calculator is comprised of one-chip LSI for the electronic calculator. The device includes a key matrix (3), and a digital display device 4, such as a LCD. The terminals Ki and Ko in FIG. 1 are interconnected in a well known manner through key matrix 3 to provide key identification. $K_1$ is a key input signal terminal, connected to an output of the oscillator. $F_c$ is a control signal for controlling output of the oscillator and determines whether the output of the oscillator (1) is to be delivered to the key input signal terminal $K_1$ of the arithmetic logic system of the electronic calculator.

Figure 2:
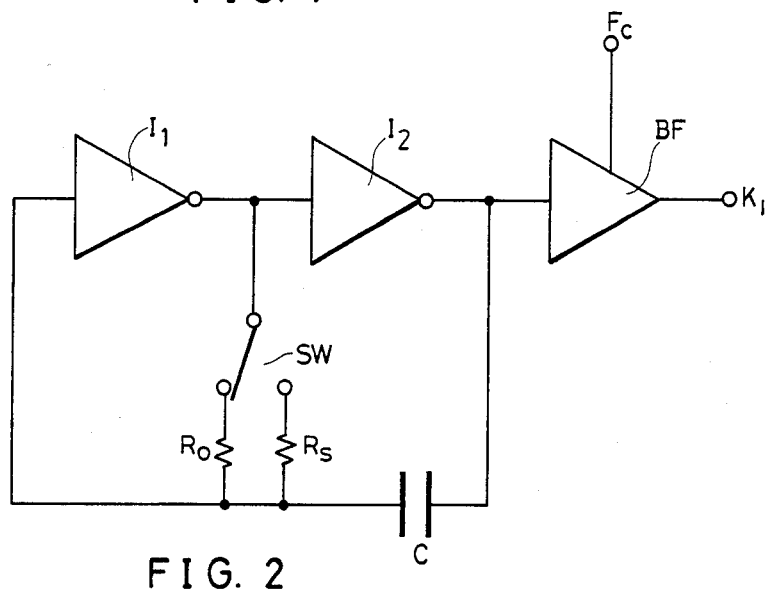
FIG. 2 is a circuit diagram of an oscillator in FIG. 1 and its related circuits.

The oscillator and its related parts are illustrated in FIG. 2.

This oscillator is a multi vibrator using a C-MOS inverter. There is a condenser C, inverters $I_1$, $I_2$, and a three-state buffer BF. Buffer BF decides whether an output pulse of the oscillator is sent to the key input signal terminal $K_1$ by control signal $F_c$.

For example, if the signal $F_c$ is avaiable at a High level, an output at a High level appears at the terminal $K_1$ and an output of buffer BF shows high-impedance when the signal $F_c$ is at a Low level. The changing-over switch SW for the resistor $R_0$ or $R_s$ is electronically switched by a signal of the arithmetic logic system (2) of the electronic calculator.

A method of detection of temperature of an embodiment using the present invention will be discussed with reference to FIG. 1 and FIG. 2. To place the device into temperature measuring mode, the control signal $F_c$ is held at a High level and the three-state buffer BF is turned on to provide the waveform of the oscillating signals to the terminal $K_1$. The switch SW is connected with a reference resistor $R_0$, and an oscillation waveform which is dependent upon oscillation time constant R·C is fed to the key input terminal $K_1$. The symbol R represents resistance generally and would be either the resistance of Ro or Rs depending on the position of switch SW and C is a constant dependent on the properties of oscillator 1. Where $f_0$ is the oscillation frequency and $\alpha$ is a ratio constant, the relation among $f_0$ and $R_0$ and C is given by following relation:

$$f_0 = \frac{\alpha}{R_0 \cdot C} \tag{1}$$

Therefore the period of oscillation $T_0$ of the oscillation waveform at $K_1$ is given by the following relation:

$$T_0 = \frac{1}{\alpha} \cdot R_0 \cdot C \qquad (2)$$

In order to determine the time $T_0$ in the arithmetic unit, a clock pulse $t_0$ and the signal at terminal $K_1$ are used and a register receives the count $M_0$.

The count $M_0$ is given by the following relation:

$$M_0 = \frac{T_0}{t_0} \qquad (3)$$

As for relation (3), $M_0$ should be made a large value to some extent by creating a relation of $T_0 >> t_0$ to reduce error. According to the above expressions (1) or (2), the count $M_0$ and the reference resistor are correlated as the following relation:

$$M_0 = \frac{R_0 \cdot C}{\alpha \cdot t_0} \qquad (4)$$

The changing-over switch SW is switched to thermometry resistor $R_s$ and the number of counts $M_s$ are calculated in the same way.

$$M_s = \frac{R_s \cdot C}{\alpha \cdot t_0} \qquad (5)$$

The counts $M_0$ and $M_s$ as in the relations (4) and (5) are divided through the arithmetic logic system (2) to evaluate $M_s/M_0$.

In order words:

$$M_s/M_0 = R_s/R_0 \qquad (6)$$

Since the relation (6) shows that $M_s/M_0$ is depending only upon the thermometry resistor $R_s$, it is easy to convert the $M_s/M_0$ ratio to temperature as long as the temperature dependency of $R_s$ is known.

For example, assuming that the thermometry resistor $R_s$ is a thermistor, the relation between the value of the resistor $R_s$ and the temperature P (in °C.) is given by the following relation:

$$R_s = R_1 \cdot \exp\left( B \left( \frac{1}{P} - \frac{1}{P_1} \right) \right) \qquad (7)$$

where $R_1$ is the value of the resistor which is determined by $P - P_1$ and B is a constant of the thermistor.

From the relations (6) and (7), $$\frac{M_s}{M_0} = \frac{R_1}{R_0} \cdot \exp\left( B \left( \frac{1}{P} - \frac{1}{P_1} \right) \right) \qquad (8)$$

The temperature P can be rewritten from the relation (8):

$$\frac{1}{P} = \frac{1}{P_1} + \frac{1}{B} \cdot \ln\left( \frac{R_0}{R_1} \cdot \frac{M_s}{M_0} \right) \qquad (9)$$

where $R_0$, $R_1$, B, $P_1$, are known constants.

Therefore, if $M_s/M_0$ is determined, the temperature P can be obtained from the arithmetic operation according to the above relation (9). It is easy to put into practice the arithmetic operation of the above relation (9) by means of the arithmetic logic system (2).

When the device of the invention is not in a temperature measuring mode, the oscillator output is not input at the terminal $K_1$, and the terminal $K_1$ may be used as a key input terminal.

With the above structure, because the output pulse of oscillator (1) is input as key signal input, it is possible to use an electronic computer, (for example, an electronic calculator) as part of the thermometry device. It is unnecessary to use such hardware as an exclusive counter. Moreover, because the arithmetic system of the electronic calculator may be used in performing calculation for temperature conversion, it is possible to execute the arithmetical operation for temperature conversion with high accuracy. The variation of the value of the thermometry resistor with temperature may show a curve.

Thus, according to an embodiment of this invention, as the key input terminal of an electronic calculator system is used for input of temperature-related information, construction of a device in accordance with the invention is simplified and the need for outside circuits is eliminated. The signal processing and the arithmetic process may be performed by the arithmetic system of the electronic calculator, so that the electronic calculator having the thermometer means may be implemented easily.

Figure 3:
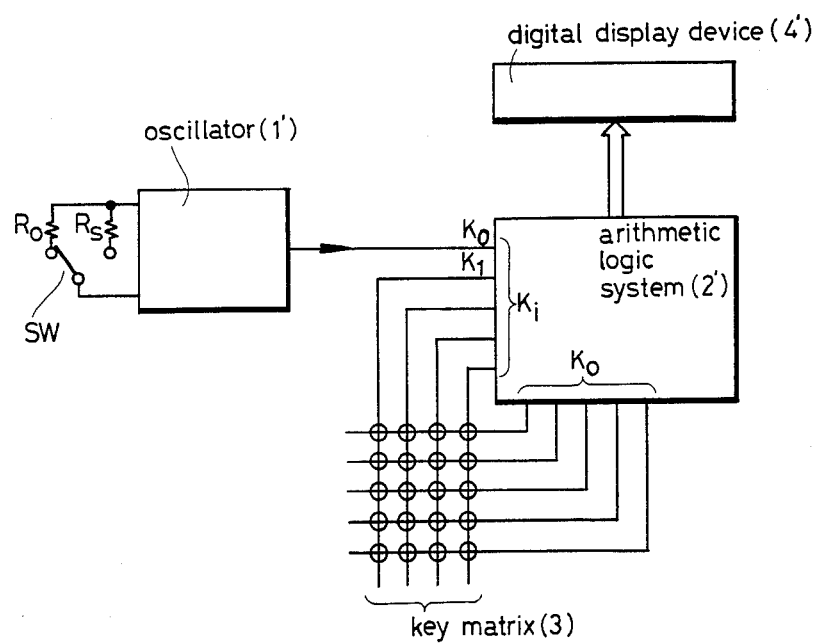
FIG. 3 is a circuit diagram of an alternate embodiment of the present invention.
Figure 4:
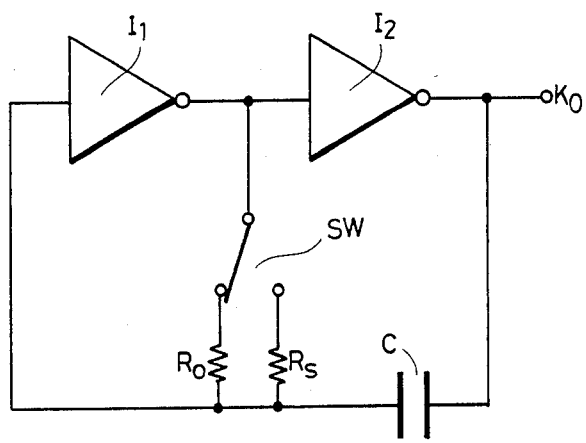
FIG. 4 is a circuit diagram of an oscillator in FIG. 3 and its related circuits.

FIG. 3 is a circuit diagram of an alternate embodiment of the present invention. A key input terminal $K_0$, shown above $K_1$ terminal in FIG. 3, matrix to set up an exclusive input terminal $K_0$ for the oscillator. In this embodiment $K_1$ represents a terminal directly connected to the key matrix 3 instead of the oscillator 1. In this case, the number of the key input terminals increases by one. However, this has the advantage of eliminating the need for three-state buffer BF and the output control signal $F_c$ for the oscillator, as shown by the circuit diagram of FIG. 4. There is no particular difference in the signal processing and arithmetic process as compared to the electronic calcuator system of FIG. 1.

Figure 5:
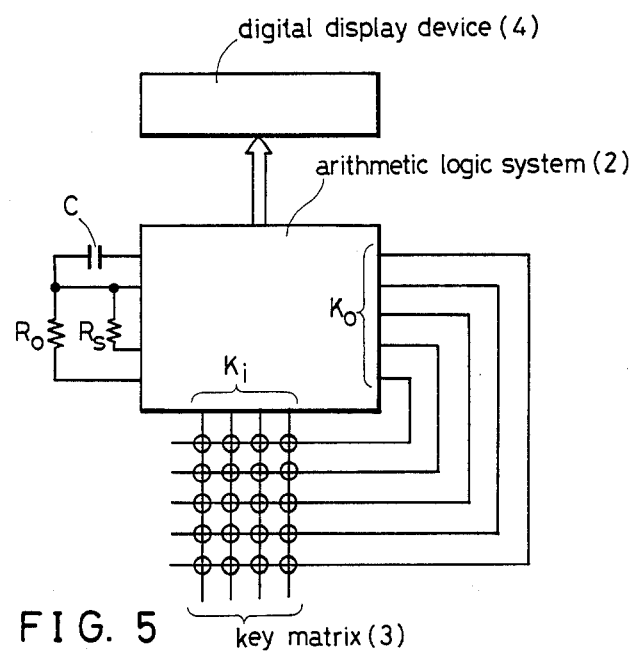
FIG. 5 is a circuit diagram of another alternate embodiment of the present invention.

FIG. 5 is a circuit diagram of still another embodiment of the present invention. This circuit comprises an oscillator inside the electronic calculator arithmetic system, minimizing expenditure for the circuit structure.

Figure 6:
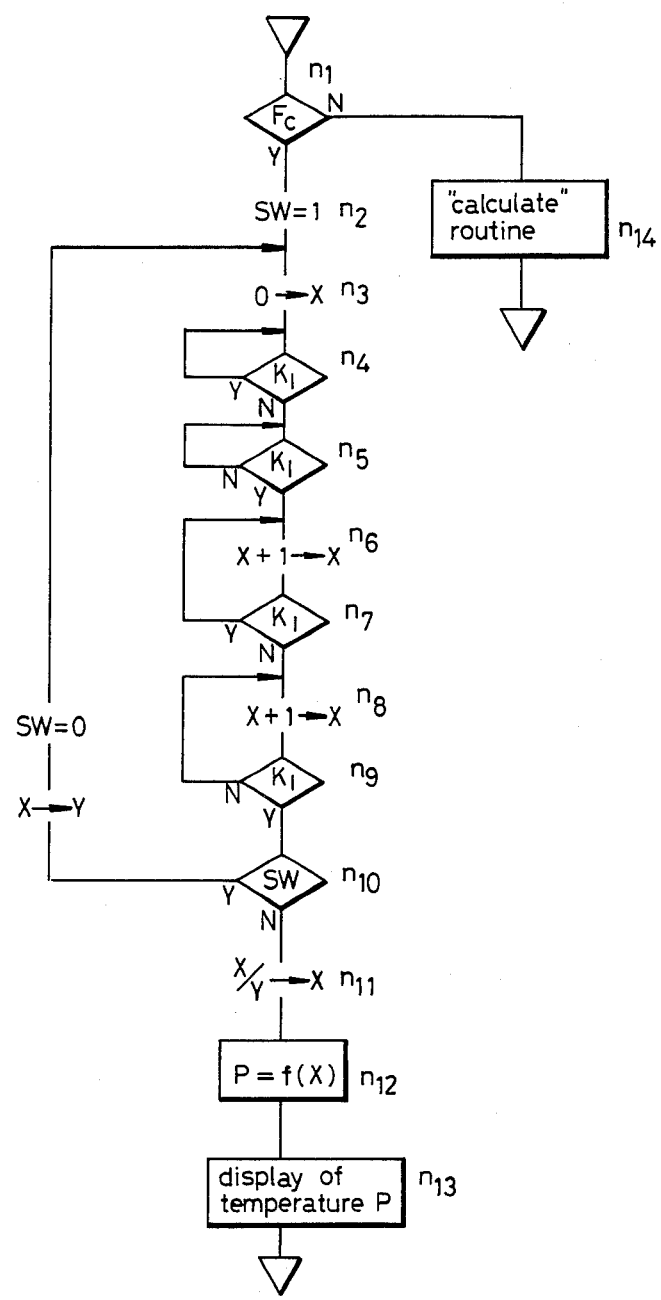
FIG. 6 is a flow chart for an explaining operation of temperature detection.

FIG. 6 is a flow chart for explaining temperature detection. The same reference numbers in FIG. 1 are used throughout FIG. 6 whenever possible. When $F_c = 1$, the circuit is in the thermometry mode, when $F_c = 0$, the circuit is in the electronic calculator mode. In the case SW = 1, a reference resistor is connected. In the case SW = 0, a thermometry resistor is connected. $N_1$ represents an optional step for setting $F_c$ to select either the thermometry or calculator mode and steps $n_4$ and $n_5$ detect the beginning of an oscillation waveform. Steps $n_6$–$n_9$ sample the oscillation waveform for a period, and count the sampled components. In this case, the count is fed to an X register when SW = 1 and to a Y register when SW = 0, as indicated in FIG. 6. A step $n_{11}$ calculates $M_s/M_0$ as in said relation (6). A step $n_{12}$ is to calculate P as in the above relation (9). In this manner the oscillation waveform is sampled and counts are made to calculate a ratio of frequency. It is therefore possible to evaluate the temperature. Therefore, this system achieves thermometry by the use of the electronic calculator system. The oscillation output which is dependent upon temperature, is connected with the key input terminal (common use or excessive use), the width of the oscillation frequency pulse may be counted by a key routine of the electronic calculator.

The temperature dependency of the resistance of the thermistor in the conventional device is inaccurate and does not show good linear relationship in a wide temperature range, thus requiring complex arithmetic logic processes. If these processes are used in the electronic calculator routine, it is possible to measure the temperature in a wide range without excessive ROM steps.

Figure 7:
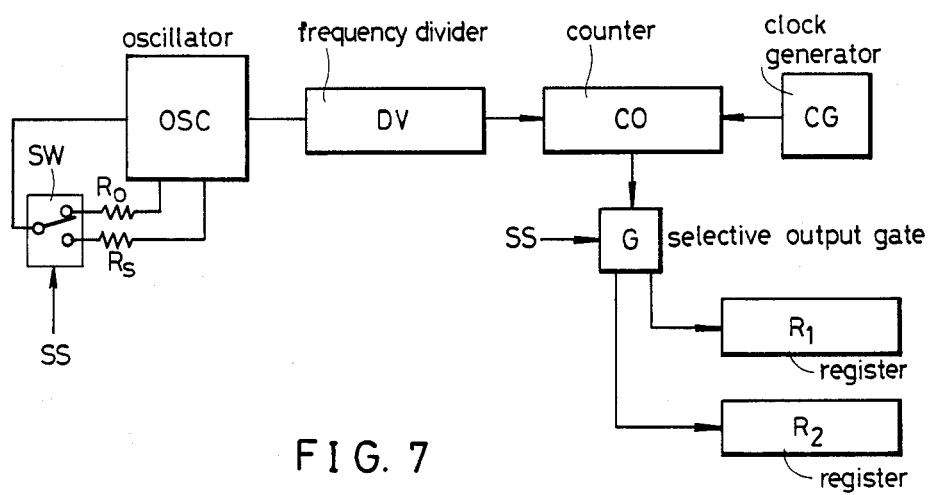
FIG. 7 is a system block diagram of the logic system of the invention.

FIg. 7 is a block diagram for further explaining operation of the present invention. The invention comprises an oscillator OSC, a switch SW switchable between the reference resistor $R_0$ and the thermometry resistor $R_s$, a divider DV dividing an oscillation waveform of the oscillator, a counter CO, a clock generator CG, a selective output gate G, registers $R_1$ and $R_2$, and a gate change-over signal SS.

FIG. 8(A)-8(E) are waveform charts for an explanation of operation of those blocks. FIG. 8(A) shows the oscillation waveform. When the change-over switch SW is connected to reference resistor $R_0$, it shows that a waveform of a frequency $f_0$ oscillating from oscillator OSC is divided into a low frequency waveform of period $T_0$ in divider DV. FIG. 8(B) shows a divided output waveform of period $T_s$, indicating that a waveform is oscillated from the oscillator OSC and divided by DV when the change-over switch SW is connected to the thermometry resistor $R_s$. FIG. 8(C) shows a reference clock pulse of period to oscillated from the clock generator CG. FIG. 8(D) shows the number of clock pulses counted when SW is switched to thermometry resistor $R_s$, that is, the number of clock pulses within a length of time from the beginning of the oscillation waveform of FIG. 8(B) to the end of that waveform. FIG. 8(E) shows the number of clock pulses counted with the reference resistor $R_0$ connected, the number of pulses counted being fed to registers $R_1$ and $R_2$, respectively. A value of temperature is calculated from a ratio of those numbers of pulses.

The way in which to count the oscillation waveform and to count the length of time (for example, a period of the divided waveform or a half period) as defined by the divided waveform is determined in accordance with the invention with regard to the reference clock pulses is especially suitable for the calculator system of the invention as compared to the conventional way of counting the output pulses from the oscillator within a given period of time, since the device can respond to the oscillation waveform in the same way that the calculator portion of the device reads key signals. It is already noted that the signal processing and the arithmetic processes may be performed by the arithmetic system of the electronic calculator. As the key input terminal of the electronic calculator system is used as the terminal for temperature measurement, simplification of circuits is assured and excess hardware is not required.

I claim:

1. A combined electronic thermometer and calculator device, comprising:

an electronic calculator comprising key matrix input means, key signal input terminals for receiving key signals from said key matrix input means, logic means for performing arithmetic operations with data input via said input terminals, and display means for displaying the results of said arithmetic operations;

said device further comprising:

oscillating means for providing a first waveform signal at a first frequency dependent upon temperature;

dividing means for dividing said first waveform signal for providing a second waveform signal of a second frequency for defining a first period of time dependent upon temperature;

means for generating reference clock pulses at a third frequency which is greater than said second frequency;

means for counting said reference clock pulses during said first period of time to obtain a first count;

means for inputting a signal representing said first count of said clock pulses to said logic means;

means for generating a third waveform signal for defining a second period of time which is independent of temperature;

means for counting said reference clock pulses during said second period of time to obtain a second count;

means for inputting a signal representing said second count to said logic means;

said logic means comprising means for determining temperature based upon a ratio of said first and second counts; and means for displaying temperature in said display means of said calculator.

2. The combined device of claim 1, comprising means for inputting said waveform signals representing said time periods to said calculator via at least one of said input terminals of said calculator.

3. The combined device of claim 1 comprising a selected one of said input terminals for receiving said first waveform signal from said oscillating means, and control means for causing said selected input terminal to selectively receive said first waveform signal from said oscillation means or key signals from said key matrix input means.

* * * * *